Oct. 25, 1960 — T. W. CHASE — 2,957,654
AUTOMATIC CONDITION CONTROL APPARATUS
Filed April 25, 1958 — 2 Sheets-Sheet 1

INVENTOR.
THOMAS W. CHASE
BY
ATTORNEY

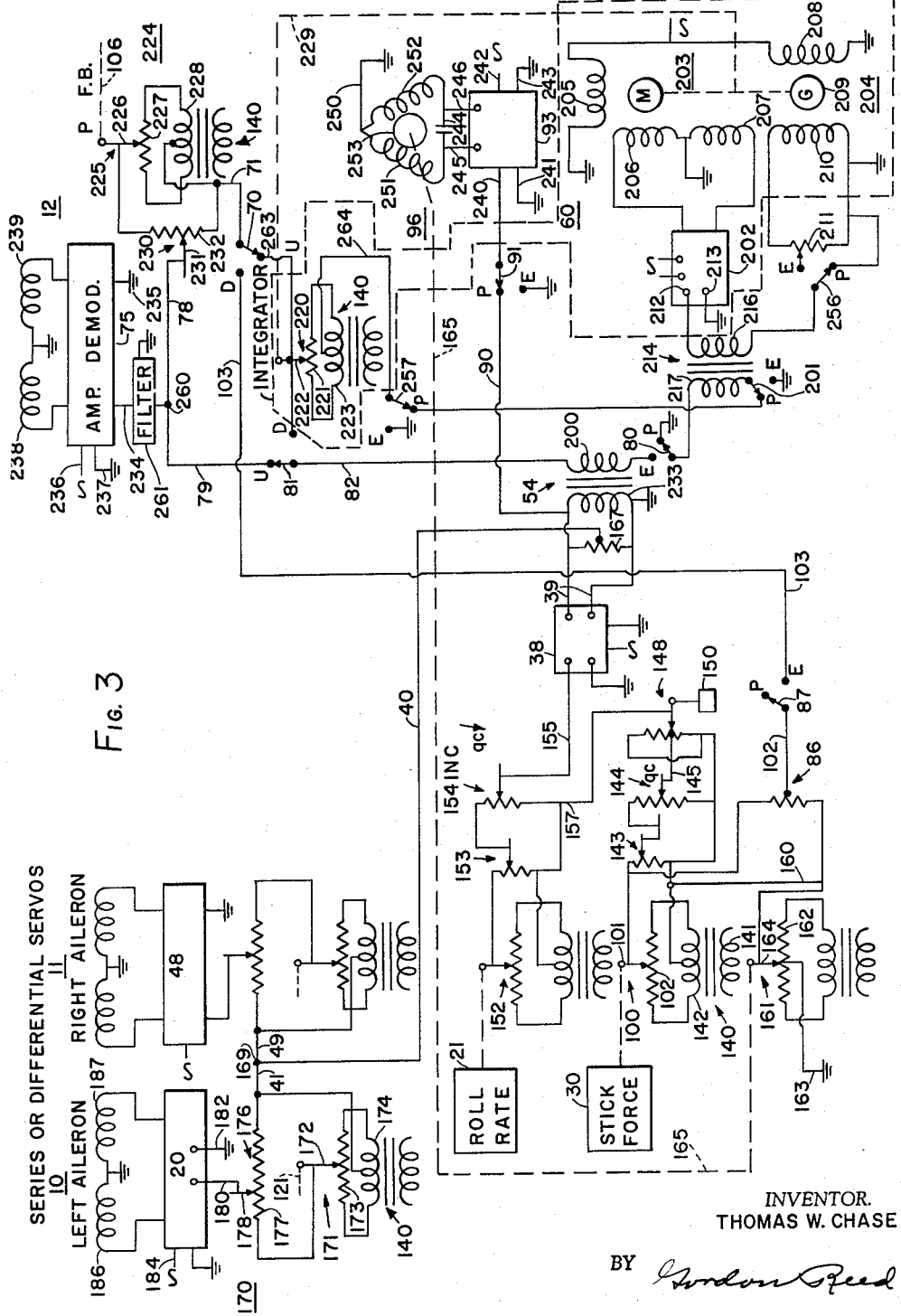

United States Patent Office 2,957,654
Patented Oct. 25, 1960

2,957,654

AUTOMATIC CONDITION CONTROL APPARATUS

Thomas W. Chase, Minneapolis, Minn., assignor to Minneapolis-Honeywell Regulator Company, Minneapolis, Minn., a corporation of Delaware Filed Apr. 25, 1958, Ser. No. 731,588

12 Claims. (Cl. 244—77)

This invention relates to automatic condition control apparatus but more particularly relates to aircraft flight control apparatus. Furthermore, the present invention relates to controlling an aircraft selectively to a flight condition such for example as an attitude or attitude rate about an axis thereof.

The control of the craft to a selected attitude or attitude rate is obtained from selective means which may comprise a source of command signal such as a manual initiated signal to which the craft responds, and sensors on the craft in turn provide some intelligence of the response of the aircraft to the initiating command signal. A comparison may be made between the commanded or ordered response and the actual response to ascertain if the desired results such as selected attitude or attitude rate is attained.

In previous apparatus such as in application Serial Number 349,835 by D. L. Markusen, April 20, 1953, now Patent 2,877,967 the command signal such as that provided by potentiometer 108 therein is summed with an opposing signal derived from potentiometer 101 denoting yaw rate and the difference or error signal is applied to an integrator providing an integral of error applied to control the craft until further response is obtained from the craft so that there is no error between the ordered signal and the aircraft response signal.

Such system as that disclosed in the application by Markusen cited includes a servomotor for controlling attitude changing devices of the craft. Such servomotor includes a servo displacement signal which is algebraically combined with the integral of the error signal whereby the servomotor displacement is in accordance with the magnitude of the integral of the error.

In some situations, a slight angular displacement of a control surface of even two degrees will result in a considerable aerodynamic loading or hinge moment. In fact this hinge moment may be of such magnitude that the servomotor, or the power actuator it is commanding, because of its low maximum power output, cannot additionally displace the surface. In other words, a maximum surface displacement is attained without actual craft response equalling ordered response and thus without the error signal to the integrator having been reduced to zero.

With such maximum motor displacement being attained, and the error signal to the integrator not reduced to zero, the integration of the error signal continues to increase while the servomotor displacement signal does not increase. An "over integration" occurs.

Should it thereafter be desired to affect attitude change of the craft in the opposite direction or to oppositely alter the attitude change rate, by changing the phase of the error signal by adjustment of the manual selective or command controller, such change of manual adjustment does not result in an immediate change in aircraft surface position and consequently in aircraft response. Instead, such aircraft surface operation and aircraft response must await the reverse operation of the integrator to remove the "over integration" until its output is equal to that provided by the surface displacement signal. An undesirable time lag thus ensues which this invention seeks to eliminate.

It is an object therefore of this invention, to prevent an "over run" of an integrator in a proportional control system to avoid delayed response of a control system to a reduced or opposite command signal.

It is a further object of this invention to terminate the operation of an integrator in a condition control apparatus when a servomotor controlled thereby has attained its maximum displacement while a persistent error signal to the integrator exists.

A further object of this invention is to terminate the operation of an integrator in such control apparatus during steady-state positions of a controlled device while an integrator input error signal persists.

A further object of this invention is to provide a flight control apparatus in which time delays are reduced to a minimum in effecting attainment of desired craft attitude rates.

The above statements are illustrative of some of the various aims and objects of this invention, and other objects and advantages thereof will become apparent upon the consideration of the following description when considered in connection with the annexed drawing, wherein:

Figure 3 is an electrical schematic arrangement of details of one embodiment of the invention in such operating mechanism.

Figure 1:
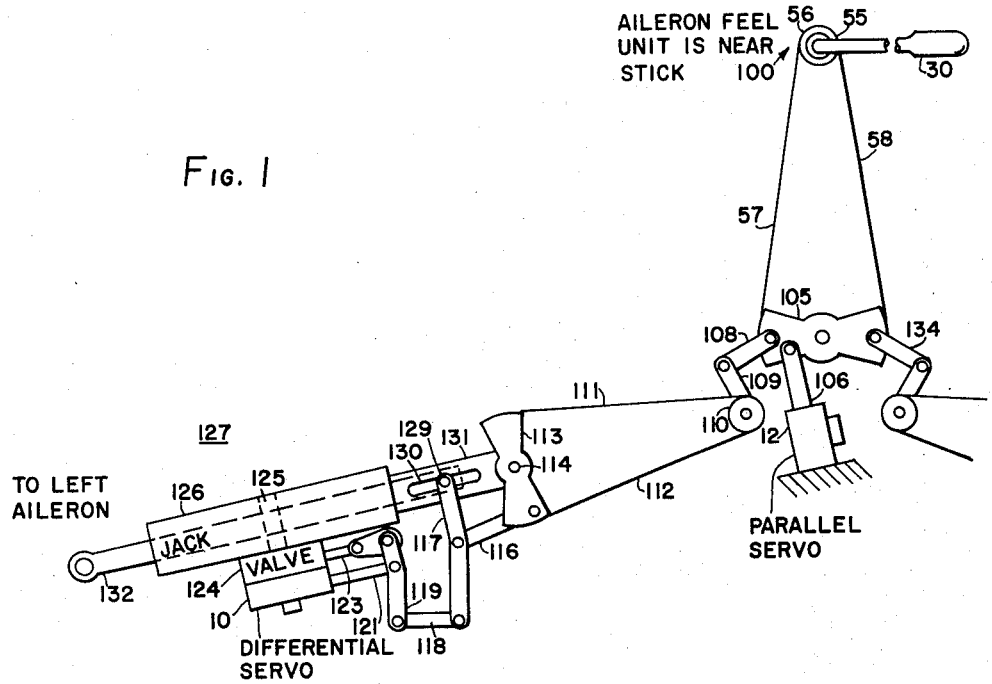
Figure 1 is a schematic of an aircraft surface operating mechanism.

In one embodiment of my invention applied to an aircraft, two differential servomotors and one parallel servo, all of the hydraulic type, are connected so as to control a hydraulic surface actuator that mechanically positions an aircraft control surface, such as the ailerons, in accordance with signals from both an autopilot and a manually operable stick controller. Electrical control signals from both the autopilot and the controller are applied to the differential servomotors which through two control valves individually control the flow of fluid to chambers within the respective differential hydraulic actuators. Such actuators conventionally include a cylinder and a piston.

When the aircraft is maneuvered or responds so that the autopilot signal is equal to the controller signal, a desired response of the craft has been attained. In some instances, the differential servomotors are given limited authority to position the control surfaces of the craft, i.e. say ten percent of permissible maximum surface displacement, consequently the autopilot response from operation of the differential servomotors may not attain the commanded response ordered by the manual controller. As implied since the displacements of the differential servomotors have attained their maximum authority with the craft not attaining the desired response, an error signal results which is the difference between the autopilot signal derived from the aircraft response and the ordered signal from the manual controller. This error signal termed first signal, is applied to an integrator of the motor operated type and the output of the integrator which is a time integration of the error signal is applied to the parallel servomotor having positional feedback to the input of the integrator.

When the parallel servomotor attains a maximum positon determined by surface hinge moment, the displacement feedback reaches a steady-state value whereas the integrator output, while its input persists, continues to increase. While such input persists, with steady-state displacement feedback, an "over integration" of the integrator occurs.

When the manually ordered signal is decreased or reversed, to reverse the phase of the integrator input signal and cause reverse operation of the integrator, the servomotor is not immediately reversed. Such reversal can only occur when the servo displacement signal exceeds the integrator output, and before this obtains, the integrator must be reversely driven to remove the "over integration" of the integrator before a reverse signal is applied to a controller for the servomotor to alter the aircraft response.

Such over integration of the integrator which causes a time lag or delay in response of the aircraft to change in position of the manual controller is prevented by supplying a second input signal to the integrator. This second integrator input signal is derived from the difference between the integrator output and the parallel servo position signals. When the servo has attained its maximum permissible displacement, while the first input to the integrator persists, the difference between the integrator output and the parallel servo displacement signal increases. This difference as it increases and which represents the second input to the integrator ultimately attains a magnitude equal and opposite to the first input signal to the integrator. When such equality occurs, operation of the integrator terminates and no "over integration" which occurs with but one input to the integrator results. Mechanism embodying these features will now be considered.

Figure 1 shows schematically one arrangement of the operating means for the ailerons including differential or series servomotors and the parallel servomotor. In the figure, a conventional control stick 30 of an aircraft may be rotated in the fore and aft direction in the aircraft. The control stick is pivoted at its lower end to an inner member 55 of a stick force transducer 100. An outer member 56 of the transducer 100 is connected by suitable means such as cables 57 and 58 to a quadrant member 105, which is pivoted on the craft. Quadrant 105 has connected thereto an output member 106 of the parallel hydraulic servomotor 12. The transducer 100 may be of the type illustrated in the patent to Mathews 2,686,896 dated August 17, 1954 and with servomotor 12 operable and due to a deformable element between the inner and outer members 55 and 56, develops an alternating voltage dependent upon the force applied to the control stick 30. Such alternating voltage from the stick force signal generator may be provided by a potentiometer or by an inductive generator such as selsyn 13 of the aforesaid Mathews patent.

Continuing with the aileron operating means, a link 108 extends from quadrant 105, and its opposite end is pivoted to an arm 109 connected to a drum 110 pivoted on the craft. Extending from drum 110 are further operating cables 111, 112 secured to a second quadrant 113 pivoted at 114. A further link 116 extends from quadrant 113 to substantially the mid-point of a first differential lever 117. One end of lever 117 has a link 118 extending therefrom to a second differential lever 119. An intermediate portion of lever 119 is connected to an output member 121 of the left aileron differential servomotor 10. The opposite end of differential lever 119 is connected by a suitable operating means 123 to a control valve 124 of aileron actuator 127.

The power section of the actuator 127 comprises the piston 125, carried by a rod 132 connected to the left aileron operating means, and a cylinder 126. The cylinder 126 is fixed to the craft and has an extension 131 which supports the pivot 114. The piston rod 132 operates within the portion 131 and has at its end remote from the aileron operating end a pin 129 connected to the remaining end of differential lever 117. The pin operates within a slot 130 of the portion 131. A similar operating means for the right aileron of the craft extends from a link 134 connected to quadrant 105 as shown.

Thus from Figure 1, the differential servomotor 10 through its output member 121 and lever 119 along with the actuator 123 for valve 124 effects control operation of the piston 125 within cylinder 126. Such operation of the piston 125 to position the left aileron, through pin 129 pivots lever 117 about an intermediate point thereof. Such pivoting of lever 117 through the link 118 repositions the second differential lever 119 in a follow-up arrangement to reposition the actuator control valve so that the piston 125 is given a displacement in accordance with the extent of operation of the differential servo 10 independent of parallel servo 12. Similarly the differential servomotor 11 for the right aileron may be operated independently of the operation of parallel servo 12.

On movement of the control stick 30, parallel servo 12 momentarily opposes rotation of quadrant 105 and such resistance permits a relative displacement of the inner and outer members 55 and 56 of the stick force transducer 100 to develop an electrical signal. Such signal effects an operation of the parallel servomotor 12 in accordance with the stick force applied to the control stick 30.

Figure 2:
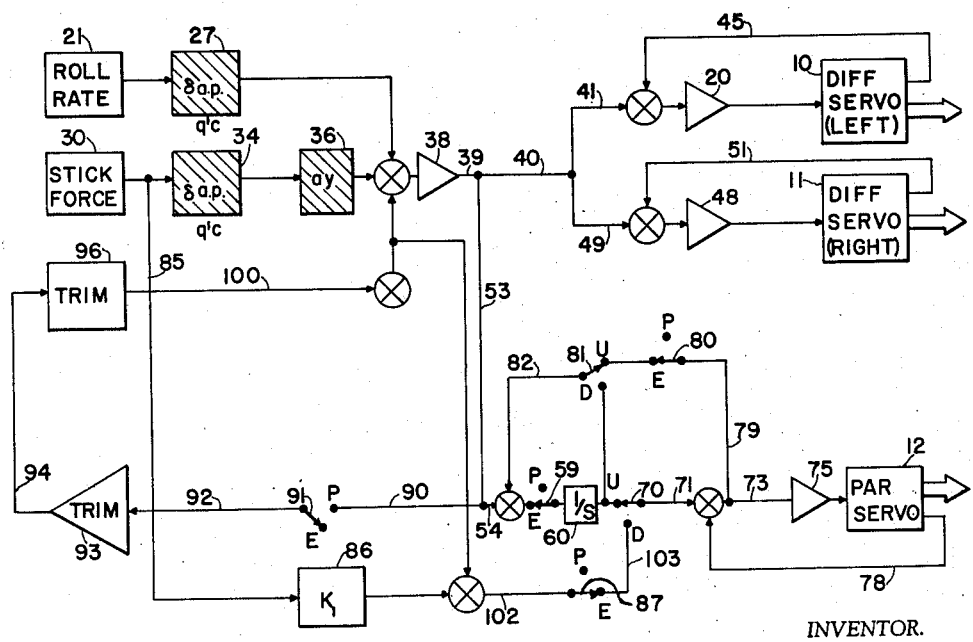
Figure 2 is a block diagram of the aircraft control surface operating mechanism embodying the principles of the invention.

Referring to Figure 2, the invention is illustrated as being applied to apparatus for controlling an aircraft about its roll or longitudinal axis. It is to be understood however, that the invention may also be applied to apparatus for controlling the craft about its normally vertical axis or its pitch axis. The apparatus comprises two differential servomotors and one parallel servomotor. A differential servomotor is often referred to as a series motor and takes such designation from its arrangement wherein its operation is not reflected back to the conventional pilot operated control stick of the aircraft. The parallel servomotor on the other hand has its operation reflected in movements of the pilot's control stick. One differential servomotor 10 controls the left aileron of the craft and the other differential servo 11 controls the right aileron surface of the craft. A parallel servomotor 12 controls both aileron surfaces differentially or in opposed directions simultaneously. Differential servomotor 10 is of the hydraulic reciprocating type having a ram and cylinder and its ram is used to position a control valve of a main actuator more fully described hereinafter. The servo 10 includes a control valve conventionally slidably positioned by electrical solenoid means (not shown). The electrical solenoid positioning means for the control valve is energized from a discriminator amplifier 20 of the electrical type.

The differential servomotor amplifier 20 is controlled by a combination of servo signals of the electrical type. This combination supplies a resultant signal which is made up of components due to the aircraft response, that due to a manual controller operation, and that to the differential servo operation.

The aircraft response for simplification is represented by a roll rate gyroscope 21 which derives a signal reversible in phase and variable in magnitude respectively in accordance with the direction and magnitude of the roll rate of the craft. This signal is modified by a gain changing device 27 in accordance with the dynamic air pressure ($q_c$) encountered by the craft in flight. A manually ordered signal is derived from a pilot operated controller 30 which may be the conventional control stick of the craft and a stick force transducer wherein relative displacement of two members provides a control signal. The signal from the manually operated stick force transducer is applied to a gain changing arrangement 34 which modifies the stick force signal in accordance with the dynamic pressure encountered by the craft in flight or $q_c$. The signal is further modified by a gain changing device 36 in accordance with the lateral acceleration ($a_y$) of the craft or the acceleration in the direction of the pitch axis of the craft.

The two signals namely that from the roll rate gyroscope 21 and that from the manually operable controller 30 are algebraically summed and applied to a signal amplifier 38 having its output applied to a transmitting means 39. The output on transmitting means 39 is applied to further transmitting means 40 and 41 to servo amplifier 20. The amplifier 20 is further controlled from a differential servomotor displacement feedback signal applied to transmitting means 45.

In a similar manner, the right differential servomotor 11 is controlled from an amplifier 48 which receives input control signals from transmitting means 40 and 49 on the one hand and servo displacement feedback signal on transmitting means 51.

Thus far, operation of the manual controller 30 commands a roll rate of the craft through the operation of the aileron surfaces, and the actual roll rate response of the craft due to such operation of the surfaces is reflected by the roll rate gyroscope 21. Consequently the output of signal amplifier 38 is the roll rate error in that the actual roll rate achieved is different from that commanded.

While the control of the two differential servomotors during flight is as thus far described, the control of the parallel servomotor 12 during flight varies. Control of servomotor 12 during a "landing gear down" configuration of the aircraft differs from its control during a "gear up" configuration of the aircraft. The two configurations of control mentioned for motor 12 are provided by a suitable switching means to be described.

In the arrangement as shown in Figure 2, the control configuration is that for the "gear up" condition denoted by U on several switching means of the aircraft. The output of amplifier 38 appearing on transmitting means 39 and controlling servomotors 10 and 11 is also supplied in a parallel arrangement to transmitting means 39 and a further transmitting means 53. From transmitting means 53 and a connecting transmitting means 54 the commanded roll rate error signal is supplied through a switching means 59 to an integrator 60.

The integrator 60 may be of the type disclosed in the aforesaid Markusen application, Serial Number 349,835 and thus is of the motor operated type. The output of the integrator 60 is applied through selective switching means 70 and connecting transmitting means 71, 73 to a discriminator amplifier 75 which operates positioning means for a control valve (not shown) of parallel servo 12. Such valve positioning means may be solenoid energized as conventionally used. Servomotor 12 may comprise conventionally a ram and cylinder. The displacement of the ram relative to the cylinder of servomotor 12 is reflected by a displacement feedback transmitting means 78 connected to the input to the amplifier 75. Thus the actual input to amplifier 75 is the algebraic sum of the output of the integrator 60 and the displacement feedback on transmitting means 78. Normally the feedback 78 in point of time substantially equals input on 70. This difference is applied not only to amplifier 75 but is transmitted through transmitting means 79, selective switching means 80, selective switching means 81, transmitting means 82, where it is summed with the commanded roll rate error on transmitting means 54.

Ordinarily the response of the amplifier 75 and the servomotor 12 is such that the difference signal on transmitting means 79 is small, and consequently is not equal to the commanded error rate signal on transmitting means 54. However, when the servomotor 12 attains its maximum displacement so that the displacement feedback signal on transmitting means 78 attains a steady state value while a commanded error rate signal persists on transmitting means 54, the integrator 60 continues to develop an increasing output signal. Ultimately this increasing output signal under the condition stated is much greater than the feedback signal on transmitting means 78. Thus the difference increases in magnitude to ultimately equal in magnitude the commanded error rate signal on transmitting means 54 but being of opposite sign will reduce the input on integrator 60 to zero. Consequently, the integrator 60 has its operation terminated during persistence of the commanded error rate signal.

During the "landing gear down" configuration denoted by (D) for various switching means, the integrator 60 is isolated and serves no control function for the parallel servo 12. In "landing gear down" the parallel servo 12 is operated as a proportional servomotor wherein its displacement is made proportional to the signal from the manual controller 30. To this purpose, the output from the controller 30 is supplied not only to the gain control device 34 but also through a parallel transmitting means 85, a gain controller 86, a switching means 87, switching means 70, transmitting means 71 and 73 to amplifier 75. The amplifier 75 is therefore controlled by a signal from manual controller 30 and the displacement feedback signal from transmitting means 78.

The arrangement of Figure 2 may also be placed in a "pre-engage" configuration by placing switching means 59, 80, 87 and 91 at (P) at which time any output of amplifier 38 on transmitting means 53 is supplied through connecting transmitting means 90, switching means 91, transmitting means 92 to a trim motor amplifier 93 which has its output supplied through transmitting means 94 to a trim motor 96. The output of trim motor 96 is combined with the roll rate signal from gain control device 27 and the manual signal from controller 30 and is of such phase as to balance the input of amplifier 38.

Additionally in the "pre-engage" configuration, switching means 59 is moved to the inoperative position to disconnect transmitting means 54 from integrator 60, switching means 87 is moved to the (P) position to isolate transmitting means 102 from transmitting means 103, switch 80 is moved to the (P) position.

If the parallel servomotor 12 is displaced from its normal position, and lacking other signals on amplifier 75, its displacement signal applied through transmitting means 78 to amplifier 75 will result in positioning of the control valve to recenter the arm of the servo in normal position to remove the displacement signal.

The entire arrangement of Figure 2 utilizes differential servomotors 10 and 11 along with parallel servomotor 12 in order that damping of the roll rate sensed by the gyroscope 21 may be damped by operation of the differential servomotors while supplying only the integrated commanded roll rate signal to the aileron parallel servomotor 12. Thus, gusts which cause change in attitude of the aircraft which are sensed by the roll rate gyroscope 21 are corrected by the differential servomotor rather than by the parallel servomotor in order to avoid motions of the control stick or controller 30 from such gusts or to minimize such movements.

Additionally the differential servomotors provide uniform roll damping to roll rate commands with a steady roll rate proportional to stick force from the manual controller 30. The required damping to roll rate commands may be obtained by modifying the gain of the stick force signal. Also the gain and authority of the differential aileron servomotor displacement feedback can be adjusted so that the differential servomotor does not drive to an extreme position during even the largest roll rates. Roll rate proportional to stick force is obtained by integrating the difference between actual and commanded roll rate thereby eventually reducing such difference to zero.

An electrical schematic of the structure embodying the invention is illustrated in Figure 3. The arrangement such as that shown on Figures 2 and 3 assume three configurations or modes namely (1) pre-engage, (2) landing gear up, and (3) landing gear down. The arrangement of Figure 3 includes various selectively operable switches related to the pre-engage, gear up, or gear down configurations. For this purpose, "E" indicates that the control system will operate the differential and parallel servomotors either in the "gear-down" or "gear-up" configurations. The leter "P" indicates that the separate trim motor is utilized to balance any electrical unbalance of the input control to the differential servo apparatus prior to permitting control by the differential and parallel servomotors. "D" indicates the gear-down configuration when the flaps, landing gear, and other structure of the aircraft is in lowered position. "U" indicates that such gear is in the raised position as during conventional flight.

The embodiment in Figure 3 includes various components having their counter part in Figure 2 and thus bear similar reference characters. In Figure 3, the control stick 30 operates the stick force transducer 100 to derive an A.C. voltage proportional to stick force. The transducer 100 is represented as a potentiometer comprising an adjustable slider 101 and resistor 102. Resistor 102 is connected across a secondary winding 142 of a transformed 140 having a primary winding 141. Slider 101 may be displaced in either direction from the electrical center of resistor 102 having a potential corresponding with that of a center tap of winding 142. An adjusting potentiometer 143 which includes an adjustable tap and coacting resistor has its resistor connected across slider 101 and a center tap of secondary winding 142. The output from the voltage adjusting potentiometer or gain control 143 is applied across a second gain control voltage dividing potentiometer 144 having an adjustable tap 145. The tap 145 is displaced along the voltage divider potentiometer resistor in accordance with the magnitude of $q_c$, the dynamic pressure of the air encountered in flight. The output from the gain control potentiometer 144 is supplied to a third gain control potentiometer 148. Potentiometer 148 includes an adjustable tap which is displaced in either direction from the mid-point of a resistor of the voltage dividing potentiometer 148 in accordance with the lateral accelerations of the aircraft. A suitable accelerometer 150 responsive to such lateral accelerations positions the adjustable tap. When the craft is not accelerating laterally, no reduction results in the signal voltage supplied to potentiometer 148.

The roll rate device 21 which may be a conventional angular rate responsive gyroscope operates the slider of a potentiometer 152 to develop a signal variable in phase and in magnitude in accordance with the direction and magnitude of rate of roll of the craft. The potentiometer includes an adjustable slider as stated and a resistor which is connected across a secondary winding of the transformer 140. A single primary winding of a transformer may supply a plurality of secondary windings and such arrangement is used herein. The output voltage from the potentiometer 152 is applied across a gain control potentiometer 153 comprising a resistor and adjustable tap. The output of this gain control potentiometer 153 is applied across a second gain control potentiometer or voltage divider 154. The potentiometer 154 includes an adjustable tap which is positioned in accordance with $q_c$ or dynamic pressure. A conductor 155 extends from the adjustable tap of potentiometer 154 to one input terminal of voltage amplifier 38. A conductor 157 extends from one end of the resistor of voltage dividing potentiometer 154 to the adjustable tap of voltage dividing potentiometer 148. A conductor 160 extends from a center tap of secondary winding 142 to an adjustable slider 164 of a trim potentiometer 161. A center tap of a resistor 162 of the potentiometer 161 is connected to signal ground 163. The other input terminal of amplifier 38 is also connected to ground and thus the roll rate, stick force, and trim signals are placed in electrical series relationship and applied to voltage amplifier 38.

The adjustable slider 164 of potentiometer 161 is positioned in either direction from the electrical center tap of resistor 162 to develop a signal variable in phase with direction and variable in magnitude in accordance with extent of displacement from the center tap. It is displaced by a suitable operating means 165 connecting it with a trim motor 96 on operation thereof.

Amplifier 38 is an A.C. to A.C. voltage amplifier. It is additionally connected to an alternating voltage supply. The input voltage supplied to amplifier 38 over conductor 155 is amplified and appears across the amplifier output conductors or transmitting means 39.

As evident from Figure 2, the output of amplifier 38 is supplied in parallel to control the differential servomotors 10 and 11 on the one hand and to the integrator to control the parallel servo 12 on the other hand. To control the differential servomotors of Figure 3 the output of amplifier conductors 39 is applied across a resistor 167. A center tap of resistor 167 has extending therefrom a conductor 40 or transmitting means 40 having its opposite end connected to a terminal 169. Thus at terminal 169 there is a resultant voltage which is a resultant of roll rate, stick force, and trim component voltages.

The voltage at terminal 169 is used to control the left aileron differential servometer amplifier 20. In addition amplifier 20 is controlled from an alternating voltage feedback signal generator 170. It includes a potentiometer 171 having an adjustable slider 172 and resistor 173. Resistor 173 is connected across a secondary winding 174 of transformer 140. The signal generator 170 includes a voltage dividing or gain control potentiometer 176 having an adjustable tap 178 and resistor 177. Resistor 177 is connected across adjustable slider 172 and a center tap of secondary winding 174. Slider 172 is operated in either direction from the electrical center of resistor 173 having a potential corresponding to the center tap of secondary winding 174 by a suitable operating means 121 to develop a signal variable in phase and magnitude with direction and extent of displacement from the center. The potentiometer resistor 173 may be carried by the differential servomotor 10 so that upon relative movement of the output member 121 and the frame of servomotor 10 a displacement signal is provided. Adjustable tap 178 has extending therefrom a conductor 180 connected to an input terminal of amplifier 20. An opposite input terminal 182 of amplifier 20 is connected to signal ground. Amplifier 20 is of the alternating voltage discriminator type and functions as an amplifier-demodulator. It includes a conductor 184 connected to an alternating voltage supply. The output of amplifier 20 is applied alternatively to two operating motor windings 186 and 187 that position the differential servo control valve (not shown in detail). As the valve is conventionally positioned in either direction from center to effect operation of the ram of the differential servomotor, the follow-up slider 172 is positioned relative to resistor 173 to derive a follow-up signal. Such follow-up signal is applied across voltage dividing potentiometer 176 and opposes the voltage at terminal 169 thereby balancing the input to amplifier 20.

In a similar manner, the voltage at terminal 169 is applied to right aileron differential servomotor amplifier 48. The output of this amplifier in turn effects the positioning in either direction of a control valve for the right aileron differential hydraulic servomotor 11. The operation of the servomotor 11 in turn develops a rebalance or follow-up signal which is placed in opposition to the voltage at terminal 169 to balance the input to amplifier 48.

The output of amplifier 38 appearing across output conductors 39 also is applied to a primary winding of a transformer 54. Transformer 54 includes a secondary winding 200 thus the total voltage across secondary winding 200 has components consisting of roll rate, stick force, and trim voltages. This voltage is applied to a balanceable control apparatus for controlling the aileron parallel servomotor 12.

This apparatus comprises an integrator 60, comprising an isolating transformer 214, an integrator signal generator 220, of the potentiometer type, a parallel servo-displacement feedback signal generator 224, and a parallel servomotor amplifier 75. In view of the fact that the parallel servomotor 12 is alternatively controlled in the gear-down and gear-up configurations, the primary operating components of the balanceable control apparatus will be here described whereas various selectively positionable switches and conductors will be described with reference to the operation of the parallel servomotor.

The integrator 60 comprises an amplifier 202, a motor 203, a velocity signal generator 204, and the integrator signal generator 220. The amplifier 202 is of the A.C. discriminator type having A.C. signal input terminals 212, 213; and alternatively energized output conductors, and supply conductors connected to an alternating voltage source. The motor 203 includes a line winding 205 energized from an alternating voltage source and amplifier energized windings 206, 207, and the direction of rotation of the motor 203 depends upon the instantaneous phase relationship of the input signal across amplifier input terminals 212, 213 with reference to the voltage across the amplifier supply conductors. The motor 203 may be a capacitor type induction motor and has its rotor connected to and in driving relation with a rotor 209 of velocity signal generator 204. Cooperating with the rotor 209 is a primary winding 208 connected to an alternating voltage supply and a secondary winding 210. The voltage induced in secondary winding 210 varies with the rate of rotation of rotor 209. The output of secondary winding 210 is applied across a voltage dividing resistor 211.

The motor 203 additionally drives through a reduction gear train (not shown) and further operating means 229 a slider 222 of a potentiometer 220 comprising the integrator signal generator. Potentiometer 220 includes a resistor 221 connected across a secondary winding 223 of transformer 140. Slider 222 is displaced in either direction from the electrical center of resistor 221 having a voltage corresponding to the potential of the center tap of winding 223 to develop a signal variable in phase and magnitude in accordance with the direction and extent of displacement from said electrical center.

The transformer 214 comprises a primary winding 217 and a secondary winding 216 and its function will be considered hereinafter. The feedback signal generator 224 comprises a servo displacement potentiometer 225, a gain control or ratio potentiometer 230, and a secondary winding 228 of transformer 140. Potentiometer 225 comprises an operable slider 226 and resistor 227. Resistor 227 is connected across secondary winding 228. Slider 226 is displaced relative to the electrical center of resistor 227 having a potential corresponding with a center tap of winding 228 in either direction in accordance with the displacement of the output member of servomotor 12 relative to the frame of such motor. For this purpose, the slider 226 is connected for operating purposes to the servomotor output member 106. Gain control potentiometer 230 comprises an adjustable tap 231 and resistor 232. Resistor 232 is connected across slider 226 and a center tap of secondary winding 228.

Amplifier 75 includes A.C. signal input conductors 234, 235, alternating voltage supply conductors 236, 237, and control valve displacement windings 238, 239 in the output section of the amplifier. Amplifier 75 is of the A.C. discriminator type and comprises an amplifier and demodulation section or amplifier and discriminator section. One or the other of windings 238, 239 is energized depending upon the phase relationship of the alternating voltage across conductors 236, 237. The windings 238 and 239 as stated position a control valve for the parallel servomotor 12 which in operation has an output member 106 Figure 1, that positions the quadrant 105 and simultaneously operates the slider 226 of the displacement feedback potentiometer 225.

For the purpose of synchronization prior to motor operation of the ailerons an amplifier control network balancing or trim arrangement comprising a trim motor 96 and amplifier 93 is provided. Amplifier 93 is of the A.C. discriminator type and comprises signal input conductors 240, 241; A.C. supply conductors 242, 243; and alternatively energized output conductors 245, 246. Conductors 245 and 246 are alternatively energized depending upon the instantaneous phase relationship of the alternating signal voltage across terminals 240, 241 relative to the voltage across the A.C. supply conductors 242, 243. Motor 96 comprises a pair of field windings 251, 252, a rotor 253, and a phasing condensor 254. Conductor 245 of amplifier 93 is connected directly through winding 251 to ground conductor 250 and also through capacitor 244 and winding 252 to ground conductor 250. Amplifier conductor 246 on the other hand is connected through winding 252 to ground conductor 250 and also through capacitor 244 through winding 251 to ground conductor 250. The amplifier-motor combination 93, 96 is a conventional A.C. discriminator-capacitor induction motor combination.

*Operation*

Prior to engaging the differential servomotors 10, 11 and the parallel servomotor 12 for operation from control stick 30 or roll rate gyroscope 21, the output of voltage amplifier 38 is nulled by moving selectors 80, 87, 91, 201, 256 and 257 to the "P" position for pre-engage synchronization. The output of amplifier 38 is applied across conductors 39 and thence across primary winding 233 of transformer 54. One end of transformer winding 233 is connected to ground and its opposite end is connected by conductor 90, switch contact "P," operable switch arm 91 to amplifier input conductor 240 of amplifier 93. The amplifier 93 effects operation of the trim motor 250. This motor through a gear train (not shown) and operating means 165 positions slider 164 of trim potentiometer 161 to provide a signal between slider 164 and a grounded center tap of resistor 162. This voltage is transmitted by conductor 160, voltage dividing potentiometer 148, conductor 157, voltage divider potentiometer 154, conductor 155 to amplifier 38 to null the input control circuit thereof.

After the aircraft is airborne, the various selector switches 80, 87, 91, 201, 256 and 257 are moved from the "P" position to the "E" position changing the configuration from the pre-engage to the engage mode when roll rate device 21 controls the servomotors 10, 11 and 12.

As stated, if the "gear" of the aircraft is in the raised position, selector switches 70, 81 remain as shown in Figure 3 engaged with their "U" contacts. At this time, the roll rate sensing device 21 may stabilize or damp movements of the aircraft about its longitudinal or roll axis by operation of potentiometer 152. Any voltage developed in potentiometer 152 in response to operation of the roll rate gyroscope 21, after passing through gain control potentiometers 153, 154 is applied through conductor 155 to voltage amplifier 38. The output of amplifier 38 appearing on output conductors 39 is applied across the resistor 167 from here by conductor 40 the voltage is applied to the differential servomotor amplifiers 20, 48.

The output of amplifier 38 which is also applied to primary winding 233 of transformer 54 appears on secondary winding 200. One end of winding 200 is connected through upwardly extending conductor 82, selector 81, conductor 79 to a terminal 260.

Between amplifier 75 and terminal 260 is a quadrature voltage signal filter 261. This filter 261 provides a high impedance path between terminal 260 and signal ground. On the other hand a low impedance alternative path between terminal 260 and signal ground is provided and comprises a conductor 78, voltage dividing potentiometer 230, conductor 71, selector 70, conductor 263, integrator signal generator 220, conductor 264, selector 257, selector contact "E" to signal ground. This alternative path to signal ground from terminal 260 has as stated a lower impedance than through filter 261 so that the voltage in winding 200 is applied through transformer primary winding 217 to secondary winding 216. One end of winding 216 is connected to integrator amplifier terminal 212. The opposite terminal 213 of the amplifier 202 is connected to ground. The opposite end of winding 216 is connected through selector switch 256, contact "E," velocity signal generator energized voltage resistor 211 to signal ground.

The integrator amplifier 202 effects operation of the integrator motor 203 which drives the velocity signal generator rotor 209 at a rate dependent upon the input signal. The integrator motor 203 additionally displaces slider 222 of the integrator potentiometer 220 to develop a voltage that is a time integral of the input voltage applied to amplifier 202.

As the slider 22 of integrator potentiometer 220 is operated, potentiometer 220 introduces a time integral voltage in the aforesaid low impedance branch between terminal 260 and signal ground to in effect increase its impedance. Consequently, a signal is passed through the filter 261 to the amplifier 75 that results in energization of one or the other of windings 238, 239 resulting in operation of the parallel servomotor 12.

The servomotor 12 in turn operates quadrant 105 which through intervening mechanisms positions the left aileron surface. Additionally through the link 134 operation of quadrant 105 also effects displacement of the right aileron. The servomotor 12 operates the displacement feedback potentiometer 225 so that the voltage from signal generator 224 substantially equals but is opposite in phase to the voltage from the integrator potentiometer 220 to restore the low impedance path.

If the servomotor 12 in its displacement of the aileron surfaces is opposed by a load equal to or greater than the maximum power output of the servomotor 12, operation of servomotor 12 will be terminated consequently the output of follow-up generator 224 does not increase. However, the integrator 60 if a voltage persists on amplifier 202, continues to operate and develops an increasing voltage from integrator potentiometer 220. A difference voltage obtained from signal generators 220 and 224 is summed with the voltage on secondary winding 200, and ultimately this difference voltage equals that across winding 200 derived from primary winding 233, to terminate operation of the integrator 60.

If the pilot had previously operated the control stick 30 in one direction from its center position and should be thereafter move the control stick in the opposite direction to reduce the stick force signal, the commanded rate signal from stick force potentiometer 100 will be less than the actual roll rate signal from potentiometer 152, so that the signal in transformer secondary winding 200 would be reversed. This would immediately effect reverse rotation of the integrator 60 to reduce the extent of displacement of slider 222 of the integrator potentiometer 220. With this reverse signal stated on winding 200 continuing and the signal from generator 220 decreasing, the voltage from potentiometer 220 equals the voltage from signal generator 224. Any further opposite rotation of the integrator potentiometer slider 222 results in reverse operation of the parallel servomotor 12 in accordance with movements with the control stick 30.

In the aircraft "gear-down" condition, selectors 70 and 81 are adjusted to engage their "D" contacts while selectors 80, 87, 91, 201, 256 and 257 as stated engage the "E" contacts. At this time, the integrator potentiometer 220 is isolated from the input circuit to amplifier 75 at selector 70. Additionally, the signal in transformer secondary winding 200 is applied in series with the voltage from integrator potentiometer 220 and transformer primary winding 217 so that the integrator potentiometer 220 develops a signal equal and opposite to that in transformer secondary winding 200 to precondition the integrator.

The stick force signal from control stick operated signal generator 100 is applied through conductor 102, selector 87, conductor 103, selector contact "D," selector switch arm 70, conductor 71, voltage dividing potentiometer 230, to parallel servomotor amplifier 75. Because of the feedback signal generator 224, the parallel servomotor 12 assumes a displacement proportional to the stick force signal. At this time, the stick force signal and the roll rate signal both of which are applied to amplifier 38 continue to control the differential servomotors 10 and 11.

Briefly reviewing the novel control of integrator amplifier 202 of integrator 60, with selectors 80, 87, 91, 201, 256 and 257 on "E," selectors 70 and 81 on "U" when a signal is initially derived in secondary winding 200, slider 226 of the feedback signal generator 224 is at its null position. Additionally potentiometer slider 222 of the integrator signal generator 220 is in its centered position. Feedback signal generator 224 and integrator signal generator 220 constitute a low impedance path from terminal 260 to signal ground and effectively short circuit the relatively high input impedance of quadrature rejection filter 261 positioned between terminal 260 and signal ground. Further, the secondary winding 200 of bridge input transformer 54 is of low impedance and the primary winding 217 of transformer 214 is relatively very high.

Initially therefore because of the low impedances mentioned, a bridge signal voltage developed across the secondary winding 200 will appear practically full strength across the primary winding 217 inducing a voltage in secondary winding 216 which is applied to terminal 212 of amplifier 202 and to signal ground through selector switch 256, contact "E" and voltage dividing resistor 211 of velocity signal generator 204. This signal ground is common with the signal ground of amplifier terminal 213.

Thus the signal applied to the integrator amplifier 202 causes the integrator 203 to drive the integrator signal potentiometer 220 to develop a voltage between slider 222 and the center tap of secondary winding 223.

The development of this voltage results in an effective increase in the shunting impedance which feedback signal generator 224 and integrator signal generator 220 present across quadrature rejection filter 261. A portion of the bridge signal voltage developed across secondary winding 200 of transformer 54 therefore appears as an input to the filter 261 which in turn supplies an input signal to servo amplifier 75.

The integrator motor 203 operates at a rate dependent upon the signal on winding 216.

The signal applied to the servo amplifier 75 effects operation of the parallel servo 12 which through the servo displacement feedback signal generator 224 develops a signal opposing that from the integrator potentiometer 220 and thus terminates operation of amplifier 75.

The time lag of servomotor 12 is relatively small so that the voltage from follow-up signal generator 224 substantially equals the voltage from integrator potentiometer 220 without appreciable time lag. If a voltage persists in winding 200 the above operation of the integrator is repeated.

However, when the servomotor 12 reaches its maximum position and the feedback potentiometer 224 develops a steady-state signal, the output of the integrator potentiometer 220 continues to increase if a voltage on amplifier 202 persists. With the novel feedback connection 79, 81, 82 to winding 200, the integrator does not continue indefinitely to increase its output as would be the case lacking such feedback. Eventually, the voltage from integrator potentiometer 220, while signal generator 224 is at a steady-state value, equals the voltage in secondary winding 200 but is of opposite sign, consequently lacking an energizing voltage no current circulates through primary winding 217 of transformer 214 and no voltage is induced in secondary winding 216. The operation of amplifier 202 is terminated. Thus the integrator 60 does not continue to run indefinitely and develop a larger integration signal on potentiometer 220 appreciably after the servomotor 12 has reached its maximum position, which maximum position may be due either, as stated, by the hinge moment of the control surface, maximum bank angle, or maximum roll rate.

While the low impedance path between terminal 260 to signal ground through selector 257 in the present arrangement is illustrated by potentiometer type signal generators 224 and 220, a similar result would be provided by inductive type signal generators of the type used in the art.

It will now be apparent that I have provided a control system for operating control surfaces of an aircraft by means of both differential and parallel servomotors wherein short period roll rate effects are damped by operation of the differential servomotors and long period roll rate effects are corrected by operation of the parallel servomotor through a novel integrator arrangement that substantially eliminates time lags to ordered changes in craft roll rate. While a specific embodiment of my invention has been disclosed modifications thereof will readily occur to those skilled in the art. The appended claims are intended to cover all modifications which do not depart from the spirit of my invention.

What is claimed is:

1. In condition control apparatus having a device for controlling said condition: means producing an error signal to change said condition; an integrator having an input section receiving said error signal and providing an output signal that is a time integral of said received signal; motor means, having signal receiving means responsive to said output signal, displacing said device to alter said condition to reduce said error signal; means providing a follow-up signal positioned by said motor means; means algebraically summing said follow-up signal and output signal; and means applying said algebraic sum to said integrator input to modify the output signal of said integrator.

2. In condition control apparatus having a device for changing said condition, in combination: means producing an error signal indicative of a change in condition; an integrator having an input section receiving said error signal and operative to provide an output signal that is a time integral of said received signal; motor means having signal receiving means responsive to said output signal and displacing said device to alter said condition to reduce said error signal; further means providing a displacement follow-up signal positioned by said motor means; combining means in said signal receiving means algebraically summing said follow-up signal and output signal to modify operation of said motor means; and means controlled by the further means and effective during steady state magnitudes of said displacement follow-up signal terminating operation of said integrator.

3. In condition control apparatus having a device for changing said condition, in combination: means producing an A.C. error signal; an A.C. motor operated type integrator having an input receiving said error signal and providing an A.C. output signal that is a time integral of said received signal; motor means having signal receiving means responsive to said A.C. output signal for displacing said device to alter said condition to reduce said error signal; means providing an A.C. displacement follow-up signal positioned by said motor means; further means in said signal receiving means algebraically summing said A.C. follow-up signal and output signal to modify operation of said motor means; and means effective on attainment of steady-state values of said follow-up signal and increase of said A.C. output signal terminating operation of said integrator.

4. In condition control apparatus having a device for changing said condition, in combination: means producing an error signal indicative of a change in condition; an integrator having an input section receiving said error signal and operative to provide an output signal that is a time integral of said received signal; motor means having signal receiving means responsive to said output signal displacing said device to alter said condition to reduce said error signal; follow-up means connected to said signal receiving means and operated by said motor means whereby said motor means is displaced in accordance with said output signal; and means connected to the integrator effective on termination of displacement of said motor means followed by increase of said output signal, terminating operation of said integrator.

5. In condition control apparatus having a device for changing said condition, in combination: means producing an error signal indicative of a change in condition; an integrator having an input section receiving said error signal and operative to provide an output signal that is a time integral of said received signal; servo means having signal receiving means responsive to said output signal displacing said device to alter said condition to reduce said error signal; follow-up means connected to said signal responsive means and operated by said servo means whereby said servo is displaced in accordance with said output signal; and means responsive to large signals on said signal responsive means terminating operation of said integrator.

6. In condition control apparatus having a device for controlling said condiiton: in combination, means producing an error signal indicative of a change in condition: an integrator having an input section receiving said error signal and providing an output signal that is a time integral of said received signal; motor means having signal receiving means responsive to said output signal, displacing the said device to alter said condition to reduce said error signal; means positioned by said motor means providing a motor displacement signal; means algebraically combining said motor displacement signal and output signal; and means effective during steady-state magnitude of said motor displacement signal and increase in magnitude of said output signal terminating operation of said integrator.

7. In condition control apparatus having a device for controlling said condition, in combination: means producing an error signal indicative of a change in condition; an integrator responsive to said error signal and providing an output that varies at a rate proportional to the magnitude of said error signal; servo means operated at a rate dependent upon the magnitude of said output signal; means driven by said servo means for opposing said output signal whereby magnitude of displacement of said servo means is in substantial agreement with the magnitude of said output signal; and means effective upon loss of such substantial agreement during increase of said output signal for terminating operation of said integrator.

8. In control apparatus having aileron surfaces for controlling craft roll rate: in combination, means producing a roll rate error signal indicative of the difference between craft roll rate and commanded roll rate; an integrator having an input section receiving said error signal and providing an output signal that is a time integral of said received signal; motor means having signal receiving means responsive to said output signal and displacing said surfaces to alter said roll rate to reduce said error signal; means positioned by said motor means providing a motor displacement signal; means algebraically combining said motor displacement signal and output signal; and means effective during steady-state magnitude of said motor displacement signal during persistence of said roll rate error signal terminating operation of said integrator.

9. In control apparatus for an aircraft having ailerons for controlling craft roll rate, in combination: a stick force transducer providing a first signal, a craft roll rate responsive device providing a second signal; means combining said first and second signals; a left aileron differential servomotor; a right aileron differential servomotor; means controlling said two differential servomotors from said combining means; an integrator having an input section connected to said combining means and providing an output sigal that is a time integral of said combined signal; a parallel servomotor positioning both right and left aileron surfaces; follow-up displacement means operated by said parallel servomotor; means controlling said parallel servomotor from said integrator output and said follow-up signal; and means effective during steady-state magnitude of said follow-up displacement signal during persistence of signals on said combining means terminating operation of said integrator.

10. In the apparatus of claim 9; means for rendering said integrator ineffective to control said parallel servomotor; and further means responsive to said stick force signal and said parallel servo displacement signal controlling said parallel servomotor.

11. In condition control apparatus having a device for controlling said condition, in combination: selective means producing a signal indicative of a desired change in condition; condition responsive means producing a second signal in accordance with the existing change in condition; means combining said signals; an integrator having an input section connected to said combining means and providing an output signal that is a time integral of said combined signal; motor means having signal receiving means responsive to said output signal displacing said device to alter said condition whereby said response signal is made equal to said selective signal; means positioned by said motor means providing a motor displacement signal; means combining said motor displacement signal and output signal; means effective during steady-state magnitude of said motor displacement signal and persistence in the error signal from said combining means terminating operation of said integrator.

12. The apparatus of claim 11; means rendering said integrator ineffective on said motor means; and means directly controlling said motor means from said selective means and from said motor displacement signal.

No references cited.